(12) United States Patent
Clark

(10) Patent No.: US 7,810,789 B1
(45) Date of Patent: Oct. 12, 2010

(54) FLOOR PROTECTIVE DEVICE FOR MOTORCYCLES AND THE LIKE

(76) Inventor: Tom Clark, 2514 E. Willow St. Unit 302, Signal Hill, CA (US) 90755

( * ) Notice: Subject to any disclaimer, the term of this patent is extended or adjusted under 35 U.S.C. 154(b) by 240 days.

(21) Appl. No.: 12/011,171

(22) Filed: Jan. 24, 2008

Related U.S. Application Data

(63) Continuation-in-part of application No. 10/970,345, filed on Oct. 21, 2004, now abandoned.

(60) Provisional application No. 60/513,715, filed on Oct. 24, 2003.

(51) Int. Cl.
*B66F 7/22* (2006.01)

(52) U.S. Cl. .................. 254/131; 254/10 R; 254/10 B; 254/10 C; 254/120

(58) Field of Classification Search ............ 248/346.03, 248/231.7
See application file for complete search history.

(56) References Cited

U.S. PATENT DOCUMENTS

| | | | | |
|---|---|---|---|---|
| 474,082 | A | * | 5/1892 | Dewey ........................ 362/415 |
| 1,064,191 | A | * | 6/1913 | Bunn ........................ 254/89 R |
| 3,427,955 | A | * | 2/1969 | Menzin ........................ 99/425 |
| 4,324,384 | A | * | 4/1982 | Elser ........................ 254/8 B |
| 5,465,529 | A | * | 11/1995 | Park ........................... 47/40.5 |
| 5,498,015 | A | * | 3/1996 | Trout et al. ................. 280/293 |
| 5,639,067 | A | | 6/1997 | Johnson |
| 5,927,689 | A | | 7/1999 | Johnson |
| 5,979,878 | A | | 11/1999 | Blankenship |
| 6,062,162 | A | | 5/2000 | Dean |
| 6,095,499 | A | | 8/2000 | Johnson |
| 6,120,876 | A | | 9/2000 | Walton |
| 6,234,452 | B1 | * | 5/2001 | Johnson ...................... 254/131 |
| 6,558,769 | B1 | | 5/2003 | Chwala |
| 6,575,310 | B2 | * | 6/2003 | Chamoun .................... 211/22 |
| 6,607,805 | B1 | | 8/2003 | Clark |
| 6,648,300 | B2 | * | 11/2003 | Chamoun ................. 254/10 B |
| D483,224 | S | | 12/2003 | Clark |
| 6,935,619 | B2 | * | 8/2005 | Chamoun ................. 254/10 B |
| 2005/0106361 | A1 | | 5/2005 | Clark |

* cited by examiner

*Primary Examiner*—J. Allen Shriver, II
*Assistant Examiner*—Alaeddin Mohseni
(74) *Attorney, Agent, or Firm*—Montgomery Patent and Design, LLC; Robert C. Montgomery

(57) ABSTRACT

The present invention comprises a generally rectangular base with two longitudinal containment lips and two semi-arcuate lips on the front and rear for the containment and display of motorcycles or similar vehicles. The apparatus is uniquely suited to hold and display motorcycles or similar vehicles in an aesthetically pleasing manner while also containing and fluid leaks or spillage that may occur during the storage or display. A pair of adjustable stands holding the vehicle. Each stand can be selectively raised and fixed in a vertical position and adjusted to hold the vehicle. The stands can be lowered to the surface when not in use or removed.

11 Claims, 3 Drawing Sheets

FLOOR PROTECTIVE DEVICE FOR MOTORCYCLES AND THE LIKE

RELATED APPLICATIONS

This application is a Continuation in Part and claims priority from U.S. patent application Ser. No. 10/970,345 filed Oct. 21, 2004 now abandoned that claims priority from U.S. Provisional Application No. 60/513,715 filed on Oct. 24, 2003.

FIELD OF THE INVENTION

The present invention relates generally to a floor covering device for motorcycles, off-road sport vehicles and the like, and more particularly to a tray with raised sides for said vehicles to sit upon for storage, to contain fluid spills, or for display purposes.

BACKGROUND OF THE INVENTION

Countless Americans enjoy riding motorcycles. The feeling of freedom and pure exhilaration while cruising the countryside with the wind in your hair is a leisure time activity for many. Many others do it out of necessity in the time of rising gas prices. Whatever the reason one has for riding a motorcycle, they do require maintenance. Any spilled liquid such as oil or gas is difficult to clean up from surfaces such as concrete and asphalt. Finally, those with prized motorcycles that are worthy of being displayed at a show or museum are constantly looking for an edge that will set their bike apart from others on display. Accordingly, there exists a need for a means by which motorcycles can be stored, worked on, and displayed in a manner without the disadvantages as described above. The development of the present invention fulfills this need.

A search of the prior art did not disclose any patents already issued that dealt directly with the aforementioned problems; however, the following table lists patents that were considered related:

| U.S. Pat. No. | Inventor | Issue Date |
| --- | --- | --- |
| 6,558,769 | Chwala | May 6, 2003 |
| 6,234,452 | Johnson | May 22, 2001 |
| 6,120,876 | Walton | Sep. 19, 2000 |
| 6,095,499 | Johnson | Aug. 1, 2000 |
| 6,062,162 | Dean | May 16, 2000 |
| 5,979,878 | Blankenship | Nov. 9, 1999 |
| 5,927,689 | Johnson | Jul. 27, 1999 |
| 5,639,067 | Johnson | Jun. 17, 1997 |

For example, in U.S. Pat. No. 6,234,452, U.S. Pat. No. 6,095,499, U.S. Pat. No. 5,927,689 and U.S. Pat. No. 5,639,067, all issued in the name of Johnson, discloses a hand-operable motorcycle stand. The devices described by Johnson involve the use of a compact, hand-operable stand merely for aiding in the raising and lowering the motorcycle. The patents issued to Johnson do not take into account the primary concern of protecting floor surfaces. Also, the Johnson patents involve many moving parts and are mainly concerned with the servicing of the motorcycle and not with displaying the motorcycle in a visually appealing manner, as is the case with the present invention. U.S. Pat. No. 5,979,878 issued in the name of Blankenship, is similar in scope to the Johnson patents, but includes pull cables, in that it involves the means to raise and lower the motorcycle for servicing, but doesn't have any of the features or advantages of the present invention.

U Several patents have been issued describing devices for protecting the interior floor of a garage or other automobile storage or service facility. Specifically, U.S. Pat. No. 6,558,769 issued to Chwala and U.S. Pat. No. 6,120,876 issued in the name of Walton has as a feature the benefit of a protector for the floor of a garage or the like that is manufactured out of a unitary material of construction and is designed to collect anything that may fall from a vehicle, including rain, snow, or slush. However, the Walton patent is concerned with protecting the floor of the garage specifically from liquid runoff from a 4-wheeled automobile and is not suitable for the aesthetic display of a 2-wheeled vehicle. U.S. Pat. No. 6,062,162, issued to Dean, is essentially a garage parking aid. The Dean device includes an anti-skid mat with means to contain any fluid spillage and a marker to aid in parking a vehicle into a garage. Again, the present invention differs from the prior art in that it is concerned with the visually appealing means of storing and displaying a motorcycle.

Consequently, a need has been felt for providing a device that can store and display a motorcycle, as well as other off-road sport vehicles, in an aesthetic manner and at the same time protect the floor of the facility in which it resides.

SUMMARY OF THE INVENTION

It is therefore an object of the present invention to provide a visually appealing means to display motorcycles or the like.

It is therefore another object of the present invention to provide means for protecting the ground or floor of a storage facility, garage, driveways, and similar surfaces from leaking fluids associated with motorcycles or, the like.

It is another object of the present invention to make any cleaning of leaking fluids quick and easy.

It is yet another object of the present invention to provide a secure means to retain the wheels of a motorcycle or the like.

Briefly described according to the preferred embodiment of the present invention, an apparatus is provided to protect the floor of a facility that stores or displays motorcycles or the like in an aesthetically pleasing manner. It is of a generally large, flat, rectangular construction that allows one to drive a motorcycle or similar vehicle onto it. Two (2) of the four (4) sides have a lip designed to contain any spilled materials. The other two (2) sides consist of a raised roll-over lip to facilitate one to drive the motorcycle or like vehicle onto the device and has an added feature of preventing the vehicle from rolling off. The roll-over lip has an added benefit of containing spilled fluids. In a preferred embodiment of the present invention, the material of construction is a highly polished, one-eighth ('/8) inch thick unitary piece of aluminum diamond plate. In order to best utilize the present invention, the user simply lays it flat upon the surface to be protected. Next, the motorcycle or similar vehicle is driven or rolled onto the present invention and placed in a parked position. The polished surface of the preferred embodiment presents a visually pleasing display and the diamond plated aluminum construction, in conjunction with the raised lips, provide means to retain the vehicle on the device. The raised lips and roll-over lips on the circumference of the device also help to contain spilled fluids.

The vehicle is retained in place by a pair of stands that are in preferred embodiment that include a holding member are pivoted so that the stands can be lowered to the surface when not in use, for storage of the device or transportation of the device. When in use the stands are locked into a generally vertical position.

The present invention is portable and can be used for any number of vehicles deigned worthy of display by the user.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
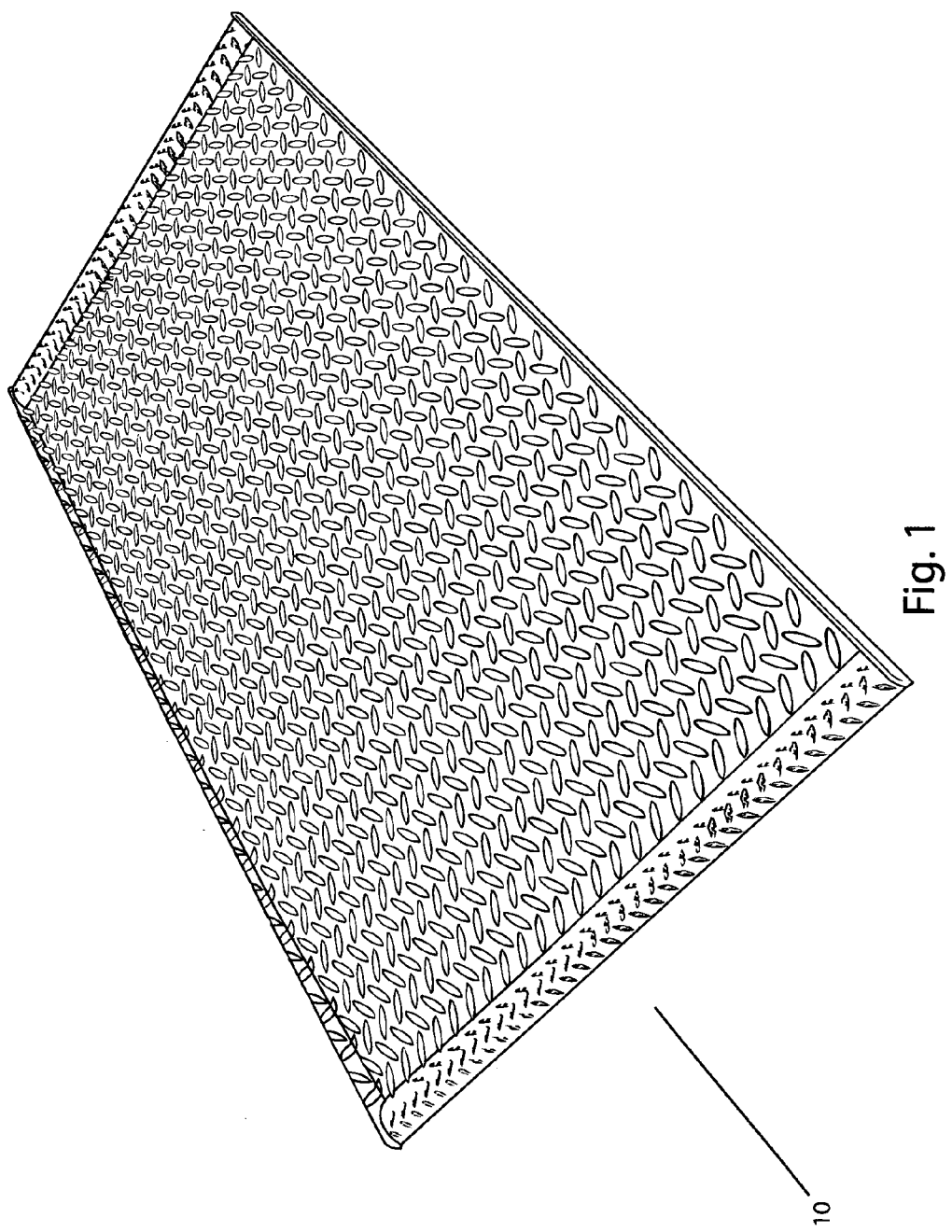
FIG. 1 is a perspective view of the floor protective device for motorcycles and the like 10, according to a preferred embodiment of the present invention.
Figure 2:
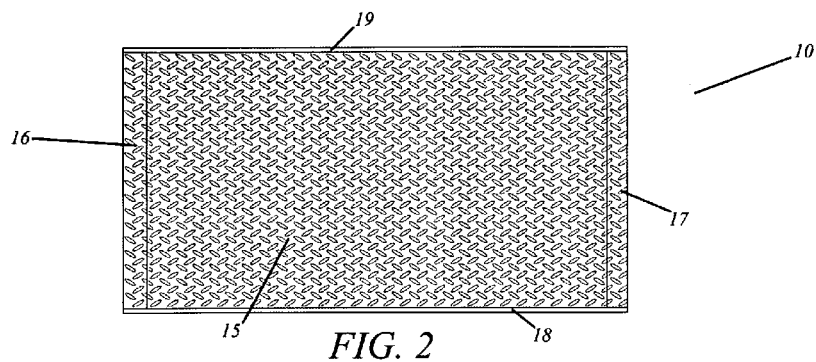
FIG. 2 is a top view of the floor protective device for motorcycles and the like 10, according to a preferred embodiment of the present invention.
Figure 3:
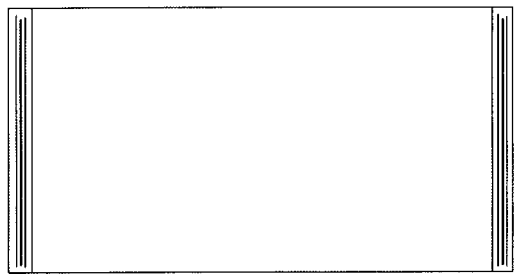
FIG. 3 is a bottom view of the floor protective device for motorcycles and the like 10, according to a preferred embodiment of the present invention.
Figure 4:
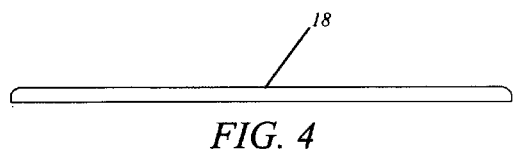
FIG. 4 is a left-side view of the floor protective device for motorcycles and the like 10, according to a preferred embodiment of the present invention.

DESCRIPTIVE KEY 10 floor protective device
15 polished diamond-plate
16 front roll-over lip
17 rear roll-over lip
18 left-side spill containment lip surface
19 right-side spill
20 stand attaching member
21 stand pivot
22 stand member
23 first aperture
24 holding member
25 second aperture
26 crank
27 holding surface

DETAILED DESCRIPTION OF THE PREFERRED EMBODIMENT

The best mode for carrying out the invention is presented in terms of its preferred embodiment, herein depicted within FIGS. 1 through 6. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and that example configurations shall be shown and described for purposes of clarity and disclosure and not by way of limitation of scope.

The terms "a" and "an" herein do not denote a limitation of quantity, but rather denote the presence of at least one of the referenced items.

Referring now to FIGS. 1-5, a perspective view of the floor protective device 10 is disclosed in accordance with the preferred embodiment of the present invention, for protecting the floor of a storage facility or like from motorcycles or similar vehicles. The device aids in containing any fluid spills or leaks that are so often associated with storing and displaying vehicles for any amount of time. Any unsightly build-up of oil or antifreeze on the ground of the storage or display facility can become a safety hazard if not contained or cleaned properly. The floor protective device 10 also has as an added feature to display said vehicle in an aesthetically pleasing manner. By placing the floor protective device 10 directly underneath the vehicle, the above problems are eliminated.

The floor protection device for motorcycles and the like 10 is comprised of a unitary sheet of polished one-eighth (⅛) inch thick diamond plate aluminum with four sidewalls forming an open upper volume to support the motorcycle or similar vehicle and to contain fluid spills. The aluminum sheet is generally rectangular in shape, and the surface of the plate has a preformed and polished diamond-plate stamped arrangement 15. This particular type of plate provides the necessary tread to retain the vehicle's wheels without the extra step for chocking the wheels in order to ensure that the vehicle will not move off the floor protective device 10. Also, the polished surface renders a mirrored look that provides an extremely pleasing visual experience.

During manufacturing, the sheet is bent perpendicularly in the vertical plane with respect to the polished diamond-plate surface 15 along the long sides of the floor protective device 10 into the left-side containment lip 18 and right-side containment lip 19 at a height sufficient for the containment of spillages. Also, the front and rear portions of the floor protective device 10 are rolled in the vertical position, thus fashioning the front roll-over lip 16 and rear roll-over lip 17, respectively. These roll-over lips are rolled in a semi-arcuate shape to a height matching that of the left-side containment lip 18 and right-side containment lip 19. The lip can be formed in the metal sheet or can be made in separate sheets and attached to the metal sheet.

Figure 5:
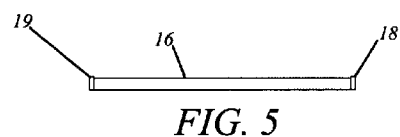
FIG. 5 is a frontal view of the floor protective device for motorcycles and the like 10, according to a preferred embodiment of the present invention; and, FIG. 6 is a perspective view of the floor protective device with stands in the generally vertical position.

As seen in FIG. 5, at the points of contact between the front roll-over lip 16 and left-side containment lip 18 and right-side containment lip 19 there exists means to effect a permanent contact point in order to produce a seal for the ultimate means of containing any spills from the vehicle on display. The permanent contact points may be achieved via adhesive or heat-bonding means. Similarly, the rear roll-over lip 17 is affixed to the left-side containment lip 18 and right-side containment lip 19 in a similar fashion. After the points of contact have been permanently sealed together, the left-side containment lip 18 and right-side containment lip 19 is rounded off at the same semi-arcuate radius as the front roll-over lip 16 and rear roll-over lip 17 to prevent any sharp edges protruding outward, thereby, creating another safety hazard (see FIG. 4).

Figure 6:
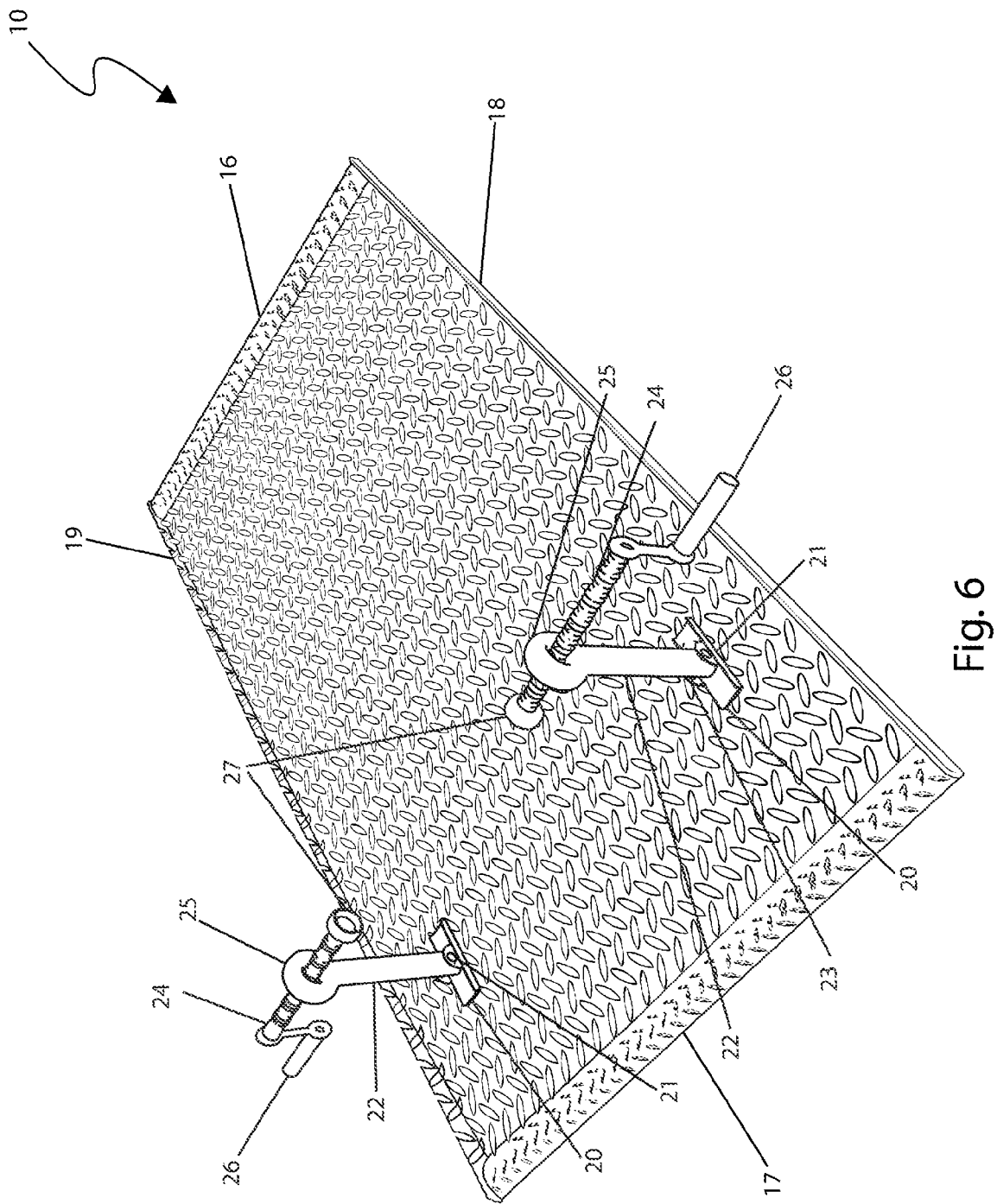

Turning to FIG. 6, a pair of stand attaching members 20 is attached to the surface 15. Each attaching member 20 is fixably attached to surface 15 with a conventional fastener such as a bolt (not shown). The attaching member 20 has a pivot 21. A stand 22 is attached at a first aperture 23 at a predetermined spacing from the bottom end of the stand 22 through which the pivot 21 is accommodated. Pivot 21 has an adjuster to hold stand 22 in a fixed position. In the preferred embodiment, the pivot 21 is a bolt and the adjuster is a nut (not shown). The stand 22 can be lowered to surface 15 when not in use, for storage or for transportation of the device by rotating the stand 22 from a generally vertical position to a generally horizontal position. At least one adjusting means, in the preferred embodiment with a threaded holding member 24 in a threaded second aperture 25, a predetermined distance from the top end of the stand 22, with crank 26 and holding surface. In the preferred embodiment each stand 22 has a threaded holding member 24, aperture 23, crank 26, and holding surface 27.

To use the invention, the user simply lays the apparatus flat upon the surface to be protected, such as garages, driveways, showroom floors, or any other storage and/or display facility. Next, the motorcycle, off-road sports or similar vehicle is driven or rolled onto the device. The vehicle, which rests on top of the floor protective device, is then stored or displayed at the length of time as determined by the user.

To hold a motorcycle or similar vehicle in place each stand 22 is raised into a generally vertical position. Each stand 22 held in the generally vertical position by an adjuster such as a bolt as pivot 21. The stand is lowered by loosening the adjuster such as a nut (not shown) on the bolt as pivot 21 and lowering the stand to the surface.

When storing or displaying the vehicle has been completed, the user merely rolls or drives the vehicle off the floor protective device.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. An apparatus for placement beneath a motorcycle or other small off-road sport vehicle for display or the collection of fluid drips and spillage comprising:
    a sheet of metal in a predetermined of shape and size having a top surface a left side, right side, front side and rear side;
    a first lip at each of said left and right sides for containment of fluids with a first predetermined shape and height;
    a second lip at each of said front and rear sides for containment of fluids with a second predetermined shape and height;
    a stand attaching member with a predetermined shape and size attached to said top surface;
    a pivot means in said stand attaching member a predetermined spacing from said surface;
    at least two stands with a predetermined length having a top end and a bottom end, said bottom end having a first aperture to accommodate said pivot spaced at a predetermine distance from said bottom end of said stand to allow said stands to rotate from a generally horizontal position to a generally vertical position and back, and a second aperture spaced a predetermined distance from said top end of said stand;
    a holding member accommodated through said second aperture for at least one stand; and
    a holding surface attached to said holding member means adjacent to such vehicle,
    wherein said holding member is a threaded member with a crank at the proximal end thereof and wherein said second aperture is threaded such that said holding member is rotated to move said holding surface laterally with respect to said stand.

2. A device according to claim 1 with at least two adjustable holding members.

3. A device according to claim 1 where in said surface is highly reflective.

4. A device according to claim 3 wherein said surface has a diamond pattern.

5. A device according to claim 1 where in said lips are formed from said metal sheet.

6. A device according to claim 1 wherein said lips are formed in separately and attached to said sheet.

7. A device according to claim 1 wherein said first lip predetermined shape is semi-arcuate.

8. A device according to claim 1 wherein said second lip predetermined shape is semi-arcuate.

9. A device according to claim 1 wherein said first and second lip predetermined shapes are semi-arcuate.

10. A device according to claim 1 wherein said first lip height and said second lip height are equal.

11. A device according to claim 1 wherein said predetermined shape of said metal sheet is generally rectangular.

* * * * *